United States Patent [19]

Robbins

[11] Patent Number: 4,695,921
[45] Date of Patent: Sep. 22, 1987

[54] FILM CHIP CAPACITOR

[75] Inventor: William L. Robbins, Newton Center, Mass.

[73] Assignee: The United States of America as represented by the Secretary of the Navy, Washington, D.C.

[21] Appl. No.: 794,984

[22] Filed: Nov. 4, 1985

[51] Int. Cl.[4] .......................... H01G 1/13; H01G 4/08
[52] U.S. Cl. ...................................... 361/308; 361/323
[58] Field of Search ................................ 361/306–310, 361/320, 321, 323, 400, 402–405, 433 C, 328; 29/25.42

[56] References Cited

U.S. PATENT DOCUMENTS

| 2,607,825 | 8/1952 | Eisler | 361/323 X |
|---|---|---|---|
| 2,842,726 | 7/1958 | Robinson et al. | 361/323 X |
| 2,887,634 | 5/1959 | Peck et al. | 361/323 |
| 3,012,176 | 12/1961 | Williams et al. | 361/323 X |
| 3,049,651 | 8/1962 | Adelson et al. | 361/323 X |
| 3,118,095 | 1/1964 | Baron et al. | 361/306 X |
| 3,319,141 | 5/1967 | Cariou et al. | 361/323 |
| 3,328,654 | 6/1967 | Wilson | 361/323 |
| 3,710,210 | 1/1973 | Heron | 361/309 |
| 3,710,211 | 1/1973 | Behn et al. | 361/309 |
| 3,740,623 | 6/1973 | Toro | 361/323 X |
| 4,220,547 | 9/1980 | Abe et al. | 361/321 X |
| 4,451,869 | 5/1984 | Sakabe et al. | 361/321 X |
| 4,555,746 | 11/1985 | Mochizuki et al. | 361/323 |

FOREIGN PATENT DOCUMENTS 17658 2/1977 Japan .................................. 29/25.42

Primary Examiner—Donald A. Griffin
Attorney, Agent, or Firm—Michael J. McGowan; Arthur A. McGill; Prithvi C. Lall

[57] ABSTRACT

A chip capacitor comprising a plurality of parallel plastic organic film layers which film layers may further include organically bonded ceramic particles, interleaved with multiple thin parallel non-precious metal electrode film layers of aluminum, copper or the like, the capacitor further comprising suitable non-precious metal end caps and connector means the surfaces of adjacent dielectric films and electrodes being bonded together using bonding agents selected to provide the mechanical stability of the film chip capacitor.

2 Claims, 4 Drawing Figures

FILM CHIP CAPACITOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to capacitors and more particularly to a miniature, low profile film chip capacitor for use as a surface mounted component.

2. Description of the Prior Art

The micro-electronics industry currently uses ceramic or glass monolythic chip capacitors for printed circuit board construction. There are three significant reasons why replacement of these currently used ceramic chip capacitors is desirable. First, ceramic capacitors presently use precious metal paladium-silver alloy electrodes, and silver end terminations. The very high costs of these metals has motivated the capacitor industry to look for alternatives. To date however, industry has had limited success with nickel or lead but generally has been unsuccessful at finding satisfactory substitutes. Secondly, ceramic chip capacitors must be produced by kiln firing at elevated temperature ($>2000°$ F.) which can generate voids and cracks. Finally, production yields are low, typically only 50 to 80%, due to the many processing variables which must be adjusted to compensate for changes in the materials used for production. Electrically equivalent chip capacitors are currently produced using ceramic or glass dielectrics with the above-cited precious metal electrodes and end caps or terminations.

Organic film dielectrics have been used in cylindrical, axial leaded capacitors as shown in FIG. 1. FIG. 2 shows a cross-sectional view of the axial leaded capacitor of FIG. 1 having the cylindrically wrapped dielectric enclosing the concentric, interleaved cylindrical electrodes and further having metal end caps connecting the electrodes to the leads. Such capacitors must be individually wound which is costly. Also, due to their relatively large diameter, i.e., at least 170 mils, these components have a high profile when mounted on circuit boards thus limiting the ability to close pack the boards.

SUMMARY OF THE INVENTION

Accordingly, it is a general purpose and object of the present invention to provide a low cost chip capacitor. It is a further object that the capacitor be of low height to permit close packing of circuit boards. Another object is that the chip capacitor use flat, organic plastic films interleaved with film type electrodes attached to end caps. A still further object is that the end caps and electrodes be of relatively low cost non-precious metals such as aluminum or copper plus bonding agents as required.

These objects are accomplished with the present invention by providing a chip capacitor comprising a plurality of organic plastic film layers, interleaved with multiple thin electrodes of aluminum, copper or the like, the capacitor further comprising suitable non-precious metal end caps and connector means.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 3:
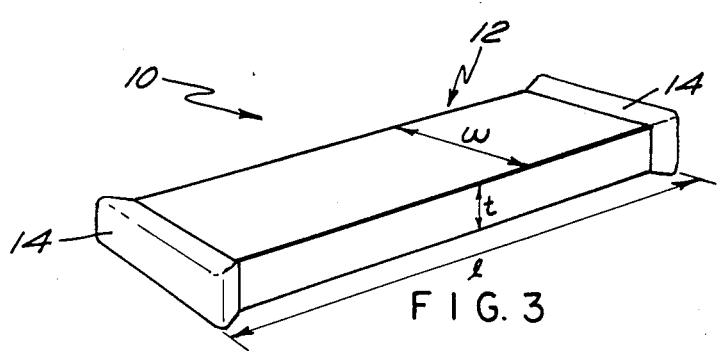
FIG. 3 shows a film chip capacitor according to the present invention.

Referring now to FIG. 3 there is shown a film chip capacitor 10 comprising a layered dielectric block 12 terminated at both ends by metal caps 14. Caps 14 connect to interleaved internal electrodes embedded in block 12 and overlap partially on the end portions of the top and bottom surfaces of block 12. Block 12 is generally rectangular having preselected length "l", width "w" and thickness "t" chosen so as to produce a low profile device of desired capacitance. Capacitor 10 is electrically attached to a host printed circuit board by solder attachment of end caps 14.

Figure 4:
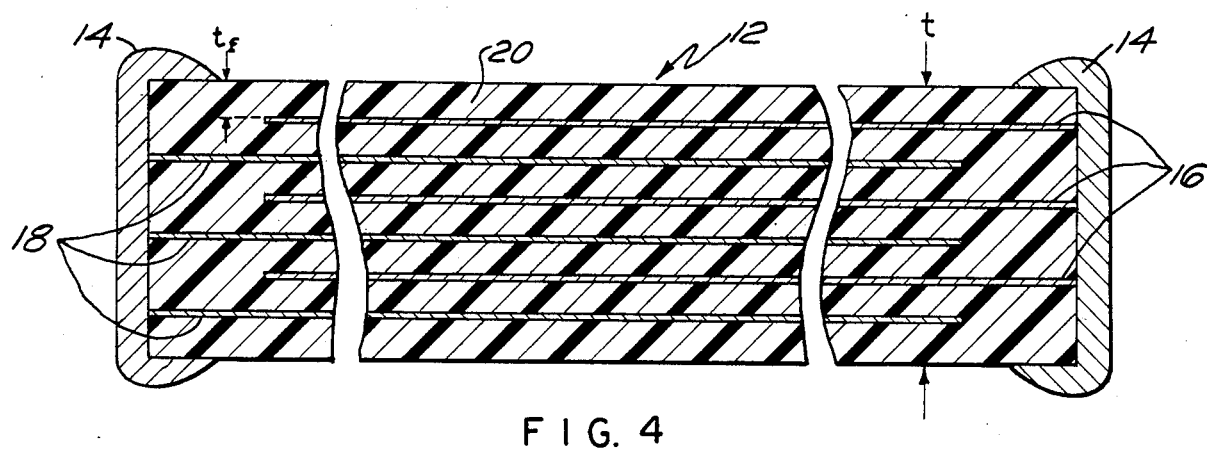
FIG. 4 shows a cross-sectional view of the film chip capacitor of FIG. 3.
Figure 2:
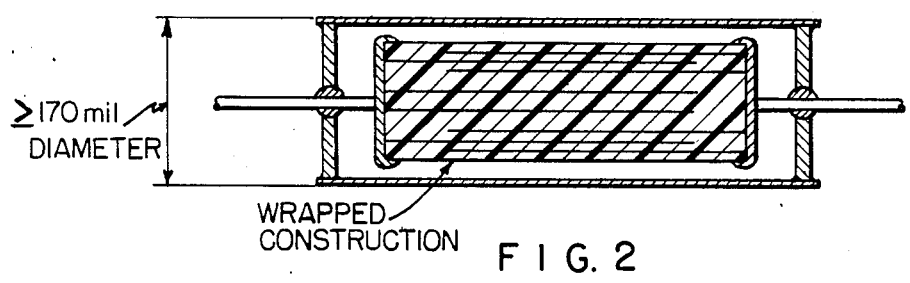
FIG. 2 shows a cross-sectional view of the prior art capacitor of FIG. 1.
Figure 1:
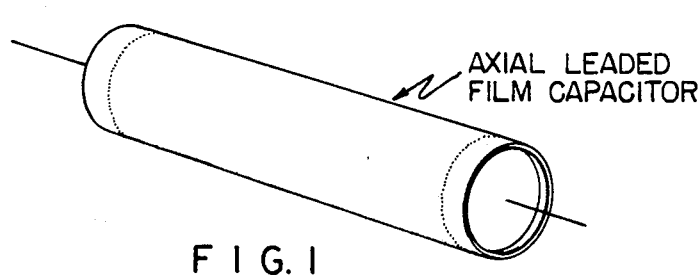
FIG. 1 shows a prior art axially leaded, cylindrical film capacitor.

FIG. 4 shows a cross-sectional view of the capacitor 10 of FIG. 3 taken parallel to the longitudinal axis thereof. Block 12 further comprises a plurality of organic film layers, each of thickness $t_f$, selected to have a relatively high dielectric constant. Alternately interleaved between each dielectric layer are a first plurality of thin, non-precious metal, parallel electrodes 16, each electrode being electrically connected at the right (as viewed in FIG. 4) end thereof to the right end cap 14 and a second plurality of thin, non-precious metal, parallel electrodes 18, each electrically connected at the left end thereof to left end cap 14. Electrodes 16 and 18 are spaced so as to alternately interleave with each other and such that each adjacent 16-18 electrode pair is separated by one dielectric film layer thickness $t_f$. Appropriate well known bonding agents are selected to enhance mechanical stability. A $t_f$ thick layer of dielectric also covers the top most electrode 16 and the bottom most electrode 18 thereby forming the outer surfaces of block 12. Film thicknesses $t_f$ typically measure on the order of $\frac{1}{2}$–3 mils while electrodes 16 and 18 measure on the order of 1/10–1 mils thick. Thus a miniature film chip capacitor having a total thickness "t" of no more than 5–10 mils may now be produced vice the θ170 mils minimum diameter prior art axial leaded capacitors of FIG. 1. The length would be about 250 mils and the width would be about 50 mils for a typical film chip capacitor. Film chip capacitors may be produced in production as long sheets of thickness t, length l and having a plurality of widths w side by side.

Metallic end caps 14 can be of low cost materials, preferably aluminum or copper with electrodes 16 and 18 then being selected of a matching material. These non-precious metals are less sensitive to radiation environments in addition to being low in cost and readily available. End caps 14 may be applied by well known methods of evaporation or sputtering of multiple layers, the end caps so produced somewhat overlapping onto the top and bottom surfaces of block 12. Organic materials suitable for the dielectric films include, but are not limited to, polycarbonate, polystyrene and polypropelene. Such films may also be impregnated with ceramic particles to produce a higher dielectric constants if desired.

A major advantage of the present device is decreased material and production costs. These cost reductions are due to three factors: substitution of non-precious metals for the currently used silver and paladium-silver electrode materials; elimination of the high temperature firing stage of production by substituting organic film dielectrics for the currently used ceramic dielectrics; and increased production yields due to the use of materials which are easier to process.

What has thus been described in a chip capacitor comprising a plurality of organic or ceramic loaded film layers, interleaved with multiple thin electrode film layers of aluminum, copper or the like, and further comprising suitable end caps and connector means.

Obviously many modifications and variations of the present invention may become apparent in light of the above teachings. For example, dielectric materials, number of electrodes, and the chip length, width and number of layers are selected based on the desired application and the availability of materials.

In light of the above, it is therefore understood that within the scope of the appended claims, the invention may be practiced otherwise than as specifically described.

What is claimed is:

1. A film chip capacitor for micro-electronic printed circuit boards, comprising:
    a plurality of flat, parallel, rectangular, organic dielectric films, each said film having a first and second end, each said film being of preselected length "l" and width "w", each said film having a thickness $t$ not exceeding 3 mils and wherein said dielectric film is an organic material containing ceramic particles;
    a first plurality of flat, parallel, rectangular aluminum electrodes, having interposed therebetween two each of said plurality of dielectric films, each said first electrode having a preselected thickness and further having a width equal to "w" and a length $<$"l" of said dielectric film, each said electrode having one end of width "w" aligned with said first ends of said dielectric films;
    a second plurality of flat, parallel, rectangular aluminum electrodes, having interposed therebetween two each of said plurality of dielectric films and one each of said first electrodes, each said second electrode having a preselected thickness equal to said first electrodes and further having a width equal to "w" and a length $<$"l" of said dielectric film, each said electrode having one end of width "w" aligned with said second ends of said dielectric films thereby forming a rectangular block having a first end and a second end, said block further having a top and a bottom, said dielectric film forming the outer surfaces thereof, the surfaces of adjacent dielectric films and electrodes being bonded together using bonding agents selected to provide the mechanical stability of said block;
    a first aluminum end cap means, perpendicular to and conductively attached to each of said first electrodes at said first block end for providing electrical mounting and conducting means to said printed circuit board; and
    a second aluminum end cap means, perpendicular to and conductively attached to each of said second electrodes at said second block ends for providing electrical mounting and conducting means to said printed circuit board.

2. A film chip capacitor for micro-electronic printed circuit boards, comprising:
    a plurality of flat, parallel, rectangular, organic dielectric film, each said film having a first and second end, each said film being of preselected length "l" and width "w", each said film having a thickness $t$ not exceeding 3 mils and wherein said dielectric film is an organic material containing ceramic particles;
    a first plurality of flat, parallel, rectangular copper of said plurality of dielectric films, each said first electrode having a preselected thickness and further having a width equal to "w" and a length $<$"l" of said dielectric film, each said electrode having one end of width "w" aligned with said first ends of said dielectric films;
    a second plurality of flat, parallel, rectangular copper electrodes, having interposed therebetween two each of said plurality of dielectric films and one each of said first electrodes, each said second electrode having a preselected thickness equal to said first electrodes and further having a width equal to "w" and a length $<$"l" of said dielectric film, each said electrode having one end of width "w" aligned with said second ends of said dielectric films thereby forming a rectangular block having a first end and a second end, said block further having a top and a bottom, said dielectric film forming the outer surfaces thereof, the surfaces of adjacent dielectric films and electrodes being bonded together using bonding agents selected to provide the mechanical stability of said block;
    a first copper end cap means, perpendicular to and conductively attached to each of said first electrodes at said first block end for providing electrical mounting and conducting means to said printed circuit board; and
    a second copper end cap means, perpendicular to and conductively attached to each of said second electrodes at said second block ends for providing electrical mounting and conducting means to said printed circuit board.

* * * * *